(12) United States Patent
Zaman

(10) Patent No.: US 8,960,652 B2
(45) Date of Patent: Feb. 24, 2015

(54) COLUMN INTERNAL SUPPORT STRUCTURE

(75) Inventor: Dewan Shamsuz Zaman, Crawley (GB)

(73) Assignee: Doosan Babcock Limited, Sussex (GB)

( * ) Notice: Subject to any disclaimer, the term of this patent is extended or adjusted under 35 U.S.C. 154(b) by 325 days.

(21) Appl. No.: 13/511,174

(22) PCT Filed: Nov. 24, 2010

(86) PCT No.: PCT/GB2010/051959
§ 371 (c)(1),
(2), (4) Date: Aug. 10, 2012

(87) PCT Pub. No.: WO2011/064580
PCT Pub. Date: Jun. 3, 2011

(65) Prior Publication Data
US 2013/0069254 A1  Mar. 21, 2013

(30) Foreign Application Priority Data
Nov. 24, 2009 (GB) .................................. 0920541.0

(51) Int. Cl.
*B01F 3/04* (2006.01)
*B01D 53/18* (2006.01)
*B01D 3/28* (2006.01)
*B01J 19/32* (2006.01)
*B01D 53/78* (2006.01)

(52) U.S. Cl.
CPC *B01D 53/18* (2013.01); *B01D 3/28* (2013.01); *B01J 19/325* (2013.01); *B01D 53/78* (2013.01); *B01D 2252/204* (2013.01); *B01D 2257/504* (2013.01); *B01D 2258/0283* (2013.01); *B01J 2219/32275* (2013.01); *B01J 2219/3325* (2013.01)
USPC ..................................... 261/114.4; 261/114.5

(58) Field of Classification Search
CPC .... B01F 3/04; B01F 3/04021; B01F 3/04049; B01F 3/04078; B01F 3/04468; B01F 3/04496; B01D 53/18
USPC ........... 261/114.1, 114.4, 114.5; 95/210, 211, 95/236; 96/296, 297
See application file for complete search history.

(56) References Cited

U.S. PATENT DOCUMENTS 8,343,445 B2 *  1/2013  Liu et al. ........................ 422/611

FOREIGN PATENT DOCUMENTS

| DE | 2220868 A1 | 11/1973 | |
| DE | 100 02 806 A1 | 7/2001 | |
| JP | 62057604 A * | 3/1987 | ...................... 62/55.5 |
| WO | WO 2010/046764 | 4/2010 | |

* cited by examiner

Primary Examiner — Robert A Hopkins
(74) Attorney, Agent, or Firm — Sughrue Mion, PLLC

(57) ABSTRACT

A column structure (1) for the containment of high surface area packing (5) and absorbent liquid reagent for the removal of a target gas from a gas stream having an elongate upright wall structure defining a perimeter comprising a closed simple polygon or closed simple curve; a support structure extending inwardly from the perimeter of the column towards the top thereof; and slung tensile members (16) attached to the wall structure of the top support structure and extending downwardly to support at least internal column structure within the walls of the column.

12 Claims, 6 Drawing Sheets

COLUMN INTERNAL SUPPORT STRUCTURE

The invention relates to a column structure for an absorption column comprising a containment vessel and structured packing for use with an absorbent liquid reagent to effect the removal of a target gas from a gas phase. The invention relates in particular to a column structure for a packed tower absorber column for removing $CO_2$ from a gas phase by means of absorption. The invention is particularly suitable for use in removing $CO_2$ from the flue gases of thermal power plants fired by carbonaceous fossil fuels, both as new build and for retrofitting into existing thermal power plants.

Most of the energy used in the world today is derived from the combustion of fossil fuels, such as coal, oil, and natural gas. Post-combustion carbon capture (PCCC) is a means of mitigating the effects of fossil fuel combustion emissions by capturing $CO_2$ from large sources of emission such as thermal power plants which use fossil fuel combustion as the power source. The $CO_2$ is not vented to atmosphere removed from flue gases by a suitable absorber and stored away from the atmosphere. Other industrial processes where similar principles might be applicable to capture post-process $CO_2$ might include removal of $CO_2$ generated in a process cycle, for example removal of $CO_2$ from the process flow during production of ammonia, removal of $CO_2$ from a natural gas supply etc.

It is known that $CO_2$ can be separated from a gas phase, for example being the flue gas of a thermal power plant, by means of absorption by passing the gas through a column where the gas flows in an opposite direction to an absorbent in liquid phase. Such a process is sometimes referred to as wet scrubbing. A well known absorbent reagent comprises one or more amines in water.

Packed tower absorber column technology is well established to exploit this. An absorption plant consists of at least one column where liquid absorber is run through the column as the gas that is to be scrubbed is passed in the other direction. The column is usually vertical and the gas introduced into the lower part of the column and fresh absorbent solution is introduced from the top of the column.

Typical columns consist of multiple sections of structured packing consisting of multiple thin plates or like structures to maximize the surface area for mass transfer. These are stacked within a containment vessel of steel or other suitable structural material. The primary loading consideration is that attributable to the weight of the column which is supported directly by the external walls of the vessel.

As used herein, the term absorption column means an elongate structure comprising one or more vessels defining process volumes wherein liquid and gas phases are countercurrently brought into contact to effect separation of a component of the gas phase into an actively absorbent component of the liquid phase.

The term column section is generally used to mean a zone within a column filling the column to its transverse extent, and being defined at the top or bottom by liquid and/or gas distributors respectively, and will typically comprise a support means for a section of packing.

The term packing refers generally to bodies of appropriate size, shape and configuration for fitment into the column to provide a high surface area volume density for the absorbent liquid to allow high mass transfer rates at the liquid-gas interface during countercurrent flow. Although random packing structures are known, where individual packing units and/or the surface elements thereof are not in a particular packing orientation, the invention particularly relates to structured packing, where individual units and the surface elements thereof have specific orientation relative to each other and, in the stacked state, relative to the columnar direction. Typical structured packings for absorbent columns for the absorption of flue gases such $CO_2$ are made of thin metal foil, expanded metal or woven wire screen stacked in layers. Polymeric material structures are also used in some cases. Thin steel foil structures are particularly preferred.

There are two basic shapes known for the vessel design, cylindrical and rectangular. Both have advantages and disadvantages.

A cylindrical vessel shape is more robust than a rectangular vessel shape for a given area and therefore requires less material for wall stiffness and support. A disadvantage of the cylindrical vessel is the difficulty associated with providing for attachment to an inner face of the column. All attachments to the vessel wall are required to be curved. Shipping issues also arise, in that a cylindrical vessel is required to be shipped in circular or semicircular segments. The cost of shipping and construction anything above 6 m diameter is significant and this has tended to impose an upper limit to size. A 6 m column is able to handle a maximum of about 100 tonnes $CO_2$ per day.

Some of these problems can be mitigated by a rectangular design. Flat plates can be more easily fabricated and shipped. However a rectangular vessel structure is inherently less stiff and this still imposes size constraints. The structured packing making up the column is supported on flat plate horizontal bed supports and this again tends to limit the size of the rectangular column, at least in the narrower rectangular dimension, to about 6 m. Practical throughputs of only a few hundred tonnes $CO_2$ per day are achievable.

Other factors are known to limit size. On the processing side, large size columns can lead to problems associated with maldistribution of one or both phases. This tends to increase with increasing diameter. Typically, the liquid phase, if distributed unequally over the column cross-sectional area because of distributor failure or irregularities in the bed structure caused by poor packing installation, causes the gas phase to distribute non-uniformly. Factors in this include strength and rigidity considerations, which tend to be a greater problem with increasing diameter.

The gas volumes involved in post-combustion carbon capture at full scale from large thermal power plants burning carbonaceous fossil fuels are on a scale out of proportion with other industries. Full scale operation might require up to 20,000 t $CO_2$ or more to be captured per day (~1000 t/hr). This presents serious upscaling issues. Packed Bed absorber towers which are capable of absorbing 700 t $CO_2$ per hour or more will present challenges of scale, design, construction and operation. A single column for a 350 MW system based on existing packing and absorbing structures and a height of 60-80 m might require to be 18 m diameter. A single column for a 800 MW system based on existing packing and absorbing structures might require to be 24 m diameter. There is thus incentive to overcome the difficulties discussed above in scaling up current single column designs.

In accordance with the invention in a first aspect there is provided a column structure for the containment of high surface area packing and absorbent liquid reagent for the removal of a target gas from a gas stream comprising:

an elongate upright column wall structure defining a column perimeter comprising a closed simple polygon or closed simple curve;

a top support structure extending inwardly from the perimeter of the column towards the top thereof;

slung tensile members attached to the top support structure and extending downwardly to support at least one internal column structure.

The internal column structure so supported may comprise any structure within the walls of the column, in particular a structure that creates a substantial load on the column.

In one possible case the internal column structure may comprise a transverse structure extending within the walls of the column and for example a transverse platform support extending within the walls of the column to provide a support structure for a high surface area packing material in familiar manner.

In another possible case the internal column structure may comprise one or more process vessels or vessel modules within the walls of the column. For example a column may have a composite assembly in which one or more process vessels or vessel modules defining absorption volumes for the absorption reaction are disposed within a perimeter structure and supported upon slung tensile members attached to the top support structure of the column. In such a case the one or more process vessels or vessel modules enclose absorption volumes for the absorption reaction. The perimeter structure transmits load to the ground but does not necessarily form a fluid enclosure. It need not be a single continuous and closed wall structure.

The top support structure may be integral with a roof closure or partial closure of the column, for example integral with a roof closure or partial closure defining a wall structure sloping in tapered manner upwardly towards the centre (for example comprising an optionally frusticated dome, ogive or pyramid). Additionally or alternatively the top support structure may be separately provided as a bespoke support structure towards the top of the column for example in the vicinity of and for example just below a column roof.

In accordance with the invention, the column has an outer wall that defines a perimeter shape. As will be familiar, the column comprises one or more process volumes for the absorption process. In a typical simple embodiment the column comprises a single vessel defining such a process volume for the absorption process, and the wall(s) of the vessel defines a perimeter shape. However the invention should not be considered as limited to such a simple embodiment. For example a column may have a composite arrangement comprising one or more inner vessels defining one or more process volumes for the absorption process within a perimeter support structure, the perimeter support structure defining a column perimeter shape. The perimeter support structure does not necessarily enclose a gas volume and therefore need not form a continuous closed outer wall but may comprise plural discontinuous upright wall elements, in which case the perimeter shape is that defined by the plural wall elements. A column may be a modular assembly of plural vessel modules each defining a part of the whole process volume, the resultant assembly defining a perimeter shape. Designs embodying combinations of these principles can be envisaged.

In all such instances, the column defines a tower suitable for use as a packed tower for a wet scrubbing process of a gas phase in familiar manner. It is distinctly characterised by the provision of slung tensile members slung from above the packing from a top support structure for example comprising part of the roof or a support structure in the vicinity of the roof to support one or more internal column structures within the column. The slung supports provide for a more even load distribution. For a given series of load parameters and materials, a greater size of column is made possible.

In a preferred embodiment, the internal column structure may comprise a transverse platform support extending within the walls of the column to provide a support structure for a high surface area packing material. In use, the vessel is used for the removal of a target gas from a gas stream by means of an absorbent liquid reagent, and the packing layer provides a high surface area for mass transport. The slung tensile members slung from above the packing from a top support structure, for example comprising part of the roof or a support structure in the vicinity of the roof, support one or more such platform structures which at least in part provide support for the packing in situ. Platform structures at the level of each section within the column are no longer supported solely by the vessel walls but are supported at least partly by the top support structure.

Preferably, a plurality of column sections each comprising such a packing layer is provided in familiar manner. Accordingly, the slung tensile members preferably support a plurality of transverse platform support structures each adapted to support a stage of packing, for example constituting in use with packing in place at least one and preferably a plurality of absorbent liquid reagent stages and at least one washing stage.

Preferably, the or each platform support structure includes a horizontal support means of lesser dimension than the outer walls of the column and supported within the outer vessel by the tensile members. The horizontal support means is preferably of a similar shape to, and for example concentrically located with, the outer walls of the column. The horizontal support means is supported by plural tensile members.

The horizontal support means in a particular preferred case comprises an outer perimeter frame supported by the tensile members and plural transverse support elements mounted thereon. If the column is circular in shape, this perimeter frame preferably comprises a smaller concentrically slung circle. If the column is polygonal in shape, this perimeter frame preferably comprises a similar polygon concentrically slung. Plural tensile means are preferably provided evenly spaced around the perimeter frame, and for example supporting each side of a polygonal perimeter frame.

In a particularly preferred assembly, a support platform level is constructed comprising transverse support elements supported by the tensile members, and for example supported on a slung perimeter frame as above described, and additional transverse support elements extending from and supported by the walls of the column and/or of a vessel or vessel module. Together, these make up a modular platform for the support of packing for a column section. Because the load is supported in part by the slung tensile members and then via the top support structure through the walls, rather than entirely directly by a platform connection at right angles into the walls, larger columns can be built to support larger loads with the same materials.

In a preferred embodiment, the internal column structure may comprise an inner vessel or vessel module contained within the walls of the column to provide a containment structure for a high surface area packing material and a process volume for the absorption process.

In particular preferably the column may comprise a composite assembly of:

at least one vessel having an elongate upright wall structure to define an absorption process volume for the containment of high surface area packing and for the countercurrent flow of absorbent liquid reagent and target gas in use;

a column perimeter structure comprising an elongate upright wall structure disposed around the at least one vessel;

wherein the at least one vessel is supported upon slung tensile members attached to the top support structure of the column.

The column perimeter structure surrounds the volume containing the at least one vessel. In the preferred case the column perimeter structure defines a continuous and closed perimeter and at least to that extent surroundingly encloses the at least one vessel. However the column perimeter structure does not necessarily enclose a gas volume and therefore need not form a continuous closed outer wall but may for example comprise plural discontinuous upright wall elements.

The column perimeter structure thus describes an outer perimeter for the column volume, which in the preferred case surrounds the column volume in closed manner, for example defining a perimeter comprising a closed simple polygon or closed simple curve, in which one or more process vessels are disposed. The process volume(s) within the vessel(s) collectively comprise a primary active absorption volume for the containment of high surface area packing and for the countercurrent flow of absorbent liquid reagent and target gas in use. The column perimeter structure comprises a secondary wall structure surrounding the active volume.

Preferably the column is structured such that the load carried by the slung tensile members is transmitted to the column perimeter structure. Thus, each inner vessel defines a process volume for the containment of high surface area packing and absorbent liquid reagent for the removal of the target gas from the gas stream. However, the perimeter structure contributes to the overall structural integrity of the column, and in particular in a preferred case carries a substantial part of the structural load of the column structure, and more preferably most of the load of the column structure.

In one possible arrangement of this embodiment the column comprises a single inner process vessel disposed within the column perimeter wall structure to define a process volume for the absorption process. In another possible arrangement of this embodiment the column comprises a plurality of vessel modules disposed within the column perimeter wall structure, the modules being adapted to be disposed together alongside one to constitute collectively a process volume for the absorption process.

The perimeter wall structure may additionally comprise a roof closure or partial closure. The roof closure or partial closure and/or additional means disposed and supported within a roof volume it defines may be adapted to contribute to a column load bearing capacity of the perimeter wall structure.

In a possible embodiment, a column may be divided into plural flow zones. Partition wall structures may be provided extending vertically along at least a part of the length of the column, and preferably the entire active length of the column, to partition the column where they so extend into at least two zones which are fluidly separate.

A convenient way of partitioning a process volume into plural flow zones is made possible by the provision of slung structures in accordance with the above. As above described, the slung structures comprise a plurality of vertically extending tensile members defining a support means for at least one and preferably a plurality of support structure levels, in particular carrying the perimeter frame of a modular support structure as above described. Preferably, the notional perimeter circumscribed by the vertical tensile members is additionally provided with a partition wall structure extending vertically along at least a part of the length of the column and preferably the entire active length of the column to partition the column where it so extends into at least one inner and at least one outer zone which are fluidly separate.

In a preferred case, such a partition wall comprises vertical wall members parallel to and either side of the tensile members. In this case, the partition wall members not only partition the internal volume of the column into two vertically defined zones, but also protect the tensile members from the fluid environment within the column, which can be particularly harsh chemically, allowing freer material selection for the required tensile properties of the tensile members.

In a preferred case, the internal partition wall will be a similar shape to, smaller in transverse extent than, and concentrically disposed within, the outer wall(s) of the column.

Although the tensile members provide a convenient location for a partition wall, partition wall structures may additionally or alternatively be provided separately of the slung tensile members extending vertically along at least a part of the length of the column, and preferably the entire active length of the column to partition the column where they so extend into at least two zones which are fluidly separate.

Walls created in this manner define at least inner and outer internal zones extending longitudinally through the column and/or a vessel or vessel module. This offers the possibility that the different zones so defined by the vertical walls may be used in different ways for different flow requirements. For example at a time of reduced flow only one of the zones might be used. A zone may be further subdivided by further internal partition vertical walls of any appropriate orientation, for example extending radially. For example the outer internal zone may be further subdivided by further, radial, wall structures.

Additionally or alternatively in the case of an embodiment comprising a plurality of vessel modules, a column may be divided into plural flow zones which are fluidly separate in that separate modules or groups of modules are adapted to serve in use as separate flow zones.

In accordance with the invention as above described, at least some of the load carried in a conventional structure by a beam/platform connection at 90° directly into and through the wall is carried instead as a tensile load in the tensile slung members and then through the top support structure, for example forming part of the roof or support structure in the vicinity of/just below the roof, into the column wall as a vertical compressive load. In addition to this arrangement being inherently more stable, and allowing the construction, all other things being equal, of potentially much larger columns, it also offers further flexibility as regards loading conditions. For example, a static pre-load may be applied to the structure. For example, a pre-stressing load may be applied prior to or subsequent to the inclusion of packing material. For example, the sling members may be pre-tensioned and/or an open frame support for a platform may be placed in compression.

In accordance with the invention, the column has an outer wall that defines a perimeter shape which is a closed simple curve such as a circle or an ellipse (that is, the column is a right cylinder) or, a closed simple polygon (that is, the column is a right prism). In the case of a simple embodiment where the column comprises a single vessel, the wall(s) of the vessel defines a perimeter shape. In the case of a composite embodiment comprising one or more inner vessels in a perimeter support structure, the perimeter support structure defines a perimeter shape. In the case of a modular embodiment comprising plural vessel modules, the walls of the modules lying externally when the modules are assembled define a perimeter shape.

In a particular embodiment the polygonal shape is preferred. Thus, in accordance with the embodiment a column structure for the containment of high surface-area packing and absorbent liquid reagent for the removal of a target gas from a gas stream with slung supports as above described comprises an elongate prismatic structure (for example comprising a single elongate prismatic vessel or modular vessel assembly or composite assembly with elongate prismatic perimeter support structure) having plural planar generally vertical walls together defining a closed simple polygonal perimeter. Although the shape may be square or rectangular, it is preferably one that approximates more closely to circular, and is for example one wherein the internal angle between each wall making up the polygonal perimeter is at least 120° and less than 180°.

The distinct shape of such a column in accordance with the particular embodiment combines some of the advantages of both principal prior art shapes, cylindrical and rectangular.

It approximates more closely to a cylindrical vessel than a rectangular vessel does. Thus, a polygonal prismatic columnar vessel structure in accordance with the preferred embodiment retains more of the inherent stiffness advantages of a cylindrical column, by its more close structural approximation to a cylindrical column, than is the case with a rectangular vessel. In particular, the stiffness for a unit area is better than that for a rectangular vessel, with consequent advantages for the stability of the structure when packed, and for the stability of platform supports for the packing material.

The potential is offered for a greater structural size (that is, a greater surface area, and hence a greater volume per unit height) for an otherwise common range of structural parameters than would be the case with a rectangular structure.

However, many of the practical drawbacks of the cylindrical vessel are reduced or eliminated. Individual vessel sections may be fabricated as and chipped as flat sheet structures. The sections themselves do not have a curved structure. Thus, the practical constraints in this regard with respect to fabrication and shipping which have tended to limit the practical sizes of cylindrical, vessels to about 6 m have been reduced. The design and installation of sealing edges necessary for tray operation may also be simplified.

A column structured in accordance with the shape of the particular embodiment obviates some of the disadvantages of both prior art designs, cylindrical and rectangular, which tend to impose vessel size constraints for a column containment vessel. Moreover, the polygonal shape works particularly well in conjunction with the tensile slung arrangement of the invention.

As has been noted, it is a particular advantage of this column shape that it can be provided in modular form for assembly in situ, in the form of modular planar sheets, with the attendant shipping advantages that accrue. In a preferred embodiment of the invention, a polygonal prismatic vessel and/or column as above described is conveniently provided in the form of a plurality of planar wall modules, each comprising a structural sheet member to constitute when assembled in situ a part of a wall, preferably having a long dimension no greater than 6 m, and a plurality of connection members to provide for connection and assembly of the same into a complete vessel and/or column in situ.

In accordance with the preferred embodiment, the column is polygonal in cross section with parallel walls defining a closed simple polygonal perimeter. Where the column is a simple single vessel, the vessel is so shaped. Where the column is a modular assembly, the modules when assembled collectively form such a shape. Where the column has a perimeter shell, at least the shell is such a shape.

The preferred shape is determined by structural considerations, and by desire to approximate more closely to a cylindrical column vessel. For example, the polygonal structure preferably comprises a cyclic polygon (that is, the vertices define a circumscribed circle), and is preferably a regular polygon (that is, equiangular and equilateral). An even number of sides is likely to be preferred, and in particular a polygon which provides paired opposite parallel sides.

Although the column has planar sides, the internal angles at the vertices of the polygon defined by each side are preferably at least 120°, and consequently the column has at least six sides. The total number of sides is likely to be a compromise between a minimum number below which a reasonable approximation to cylindrical structure is lost and a maximum number which reflects a desire to minimize complexity of assembly. A column with 12 to 20 sides will typically be preferred for most applications.

Prior art vessels have typically been provided with a dished or domed wall and/or base to complete the closure. The top and/or base of the present column and/or of a vessel or vessel module thereof may comprise a partly pyramidal structure. In particular, in the case the column is a polygonal prism, the top and/or base may comprise a planar wall structure in which wall sections making up the top and/or base extend from the respective perimeter walls making up the polygonal column. Again, such structures are easier to manufacture, for example on a modular basis, and to transport for assembly in situ.

The column of the present invention is adapted for vertical operation, and for example adapted for the liquid to flow downwards from an inlet near the top and for the gas to be circulated counterwise upwards from an inlet near the bottom.

It is a particular advantage of the present invention that larger sized column structures, and in particular column structures with a larger transverse extent and thus a larger volume per unit height, can be constructed. In the preferred case, the column is so structured as to have a minimum dimension in a transverse direction which is at least 10 m and more preferably at least 15 m to 30 m or more.

As discussed above, the throughput rates required for large thermal power plants would suggest a requirement for cylindrical column structures with a diameter of 18 m to 24 m or more. A column structure in accordance with the present invention preferably has comparable transverse dimensions. For example, in the preferred case where the column structure comprises a cyclic polygon such as a regular polygon, it can be defined by a circumscribed circle having such a diameter.

This can be contrasted with present vessels, where structural, fabrication and transport considerations applicable to conventional practical materials such as structural steel have been held to limit the practical dimensions of a cylindrical vessel to a diameter of around 6 m, and to limit the practical shortest direction of a rectangular vessel to a similar 6 m.

The envisaged use of a column structure in accordance with the invention is as a packed tower comprising high surface area packing material and absorbent liquid reagent for the removal of a target gas from a gas stream. In a more complete embodiment of the invention there is provided such a packed tower absorber column comprising a column structure as above described with packing material in situ. The or each vessel or vessel module making up the column is intended in use to contain absorption packing structures and to allow liquid absorbent and gas to be circulated counterwise through the packing structures thus constituting an absorber process volume.

In a particular preferred case the column structure comprises a plurality of support platform structures carrying packing material in a plurality of column sections, including at least one and preferably a plurality of absorbent liquid reagent stages and at least one washing stage.

Preferably, the packing material is a structured packing material. The structured packing material provides a high surface area structure to provide a high gas/liquid contact area per unit volume for high mass transfer, and may be of suitable familiar form, in particular providing plural arrays of thin corrugated metal sheet. The precise nature of the packing material is not pertinent to the invention, which is intended to be used with known packing materials and known absorbent chemistries, but which will also support new packing materials and chemistries as they are developed.

In a more complete embodiment, the internal volume of the column preferably further comprises, typically for example disposed at the top of each structured packing section, one or more of a collector structures, a distributor structure, and a bed limiter in familiar manner. The column may further comprise in a washing stage a demister structure. All the foregoing will be of familiar design scaled up as applicable to the larger columns made possible in the present invention.

The column preferably further comprises a means to supply absorbent solution through one or more inlets in the vicinity of the top of the column.

In the preferred application the column is a $CO_2$ wet scrubber, and the solution may comprise one or more aqueous amines, for example including but not limited to monoethanolamines or methyl-diethanol-amines.

In the preferred application the column is provided for use in a scrubber column for flue gases and is provided with a flue inlet towards the bottom of the column.

The invention will now be described by way of example only with reference to FIGS. 1 to 6 of the accompanying drawings, wherein.

Figure 1:
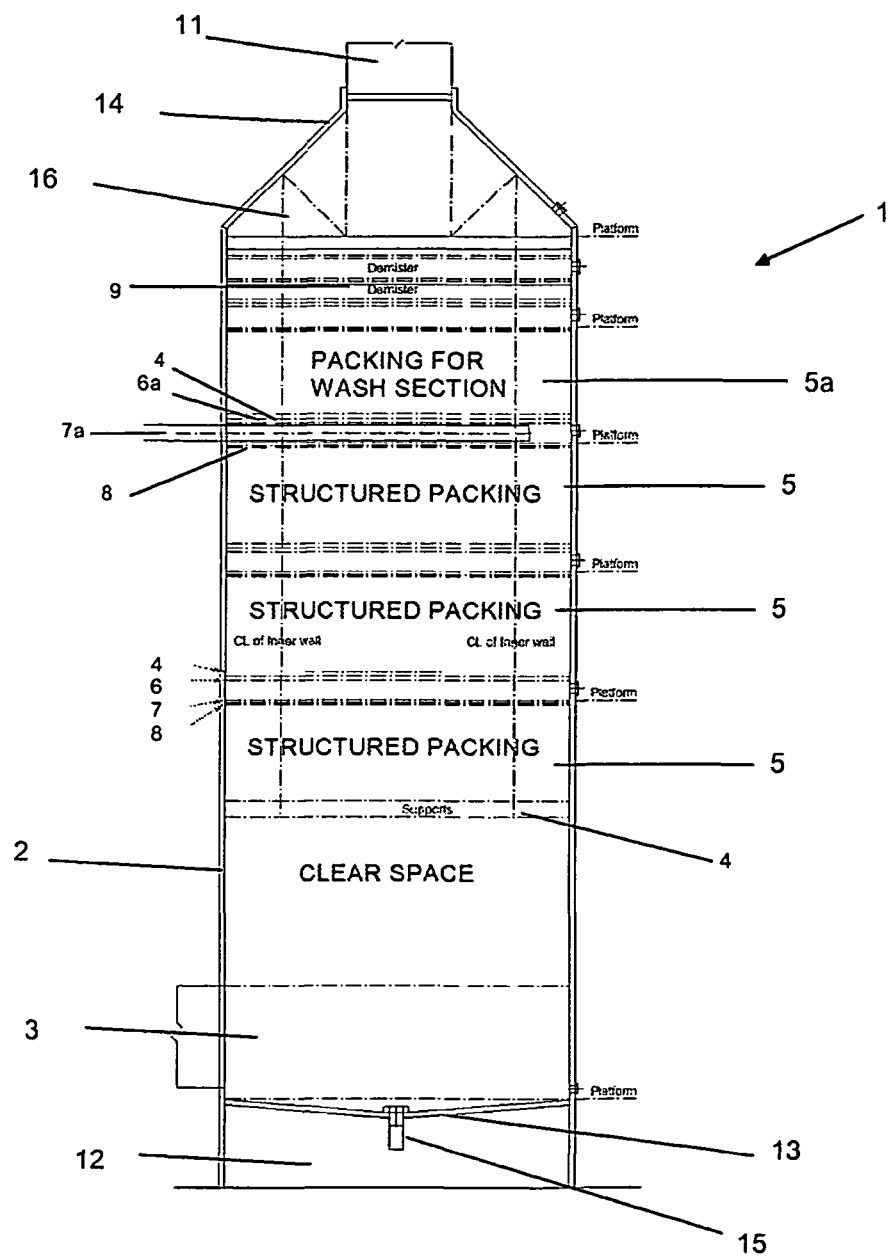
FIG. 1 is a longitudinal cross section through a column structure comprising a vessel embodying the principles of the invention.

FIG. 1 illustrates a vertically oriented column to serve as a flue gas scrubber or absorber for post-combustion capture of $CO_2$ from the flue gas of a thermal power plant using a carbonaceous fuel source. The column of FIG. 1 embodies the structural principles of the present invention as illustrated in more detail in the other figures, although the stages and active materials illustrated in FIG. 1 could also be an exemplification of a prior art flue gas scrubber or absorber.

The column 1 comprises an outer containment vessel having, as is more clear from subsequent figures, a plurality of vertical planar walls 2. The vessel defines a gas inlet 3 which in the example is an inlet for flue gases (which may be direct or partly pre-processed) from a thermal power plant, and a gas outlet 11 which will vent flue gases to atmosphere or pass for further processing having been scrubbed. The flue gases circulate from bottom to top, and absorbent solution is introduced towards the top of the column to circulate in the counterwise direction in familiar manner.

In the embodiment, four column zones comprising separate sections of structured packing are shown, being three structured packing layers 5 which provide the necessary surface area for contact between absorbent solution introduced by the main distributor 7a and flue gases circulating upwards, and additionally a structured packing layer 5a for a wash section. Such a structure will be generally familiar.

Each structured packing section is carried on a support 4 and is topped by a bed limiter 8. The levels of structured packing below the main distributor 7a are provided with secondary structures acting as collectors 6 and secondary distributors 7 for the absorbent solution. A wash collector 6a is provided at the bottom of the wash section packing 5a. A demister 9 is provided at the top of the column.

Such multiple stages and structures will be generally familiar to the person skilled in the art from generally equivalent structures found in prior art cylindrical columns. The illustrated embodiment differs from such prior art cylindrical columns in two ways in particular, both of which offer the potential for it to have much increased cross sectional area. First, as is more apparent from subsequent figures and is discussed in detail below with reference to FIG. 2, it has a polygonal rather than cylindrical shape.

Second, as can be seen in FIG. 1, the supports 4 are not merely supported by the walls 2, but are also supported by elongate tensile members 16 slung from the roof 14. Additionally or alternatively tensile members may be slung from a support structure inside the roof. This additional support structure transfers the load in a more stable way into and directly down through the walls 2.

The tensile members 16 preferably comprise high tensile strength steel wire. In the preferred case, although this is omitted from FIG. 1 for clarity, these wires are contained within paired parallel vertical internal walls to protect them from the process environment. In addition to providing environmental protection by environmental isolating the wires themselves, these paired walls have the further effect of dividing the internal volume of the column 1 into an inner zone and an outer zone. By provision of suitable controls to selectively close off the respective zones an additional advantage is conferred in that operation of the column at less than full capacity, for example by operating just one of the zones, is made possible. Further internal walls may be provided, for example comprising radial walls to divide the outer zone into multiple sub zones.

The outer wall structures 2, and the internal walls, are preferably fabricated from structural steel plate sections.

The operational process is familiar. A suitable absorbent liquid such as, in a familiar chemistry, amine dissolved in water, is used. The gas to be scrubbed, in the embodiment flue gas from a thermal power plant, is introduced into the lower part of the column via the gas inlet 3 and fresh absorbent solution is introduced from the top of the column. The absorbent liquid runs down through the structured packing 5 as the $CO_2$ rich flue gas passes up through it.

$CO_2$ in the flue gas will be absorbed by the amine solution by formation of weak chemical bonds. Thus, as is familiar, the amine solution is enriched with $CO_2$ as it travels down the column and $CO_2$ is removed from the flue gas as it travels up the column. When the flue gas reaches the top of the column it is vented to the atmosphere or passed for further processing via the outlet 11, at which point a large proportion of the $CO_2$ has been removed.

$CO_2$ enriched amine solution passes through the floor 13 into the lower volume 12 to be discharged via outlet 15. The floor 13 is designed using flat plate and sloped at 5° to the horizontal. The floor stiffener is integrated with the central outlet 15.

The solution is passed on to suitable apparatus for recovery of the $CO_2$. Typically this process involves regenerative heating of the amine solution. At higher temperatures the solution will release the absorbed $CO_2$ and be regenerated for reuse in the absorption column. The released $CO_2$ is collected for sequestration.

The principles of chemistry are thus familiar. What distinguishes the column of the present invention, as exemplified by the embodiment described in detail, is the column structure by which this chemistry can be applied on a much greater scale than for a typical prior art 6 m column.

Figure 2:
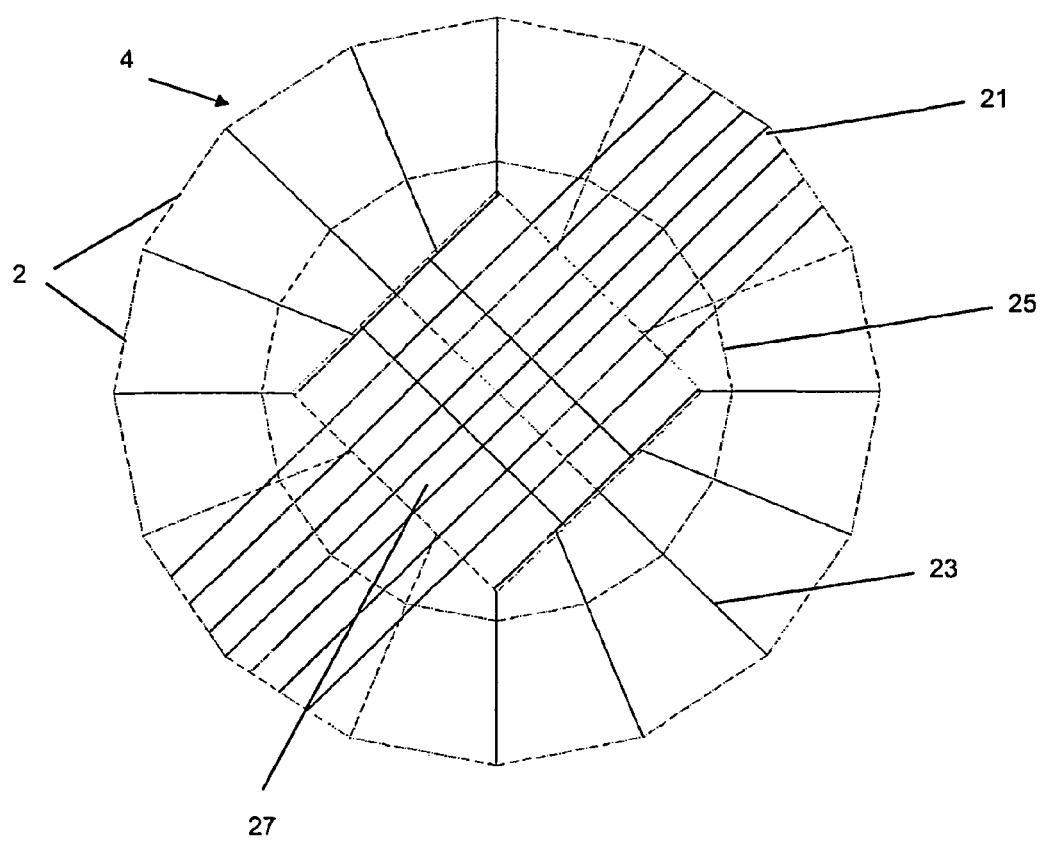
FIG. 2 illustrates in plan view a slung floor support at a first platform level of the embodiment of FIG. 1.

FIG. 2 illustrates in plan view the support platform structure 4 at a first support level.

As can be seen in FIG. 2 the outer walls of the vessel 2 are planar walls welded together so as to form when complete a regular polygonal structure, in this case a regular sixteen sided structure. This polygonal structure in itself confers several advantages. Walled sections may be manufactured as flat steel plate, with advantages of manufacturing shipping associated therewith, but nevertheless assembled into an overall structure which more closely approximates to a cylinder, sufficiently closely at least to get some of the benefits of structural stiffness that follow on from such a cylindrical structure.

Additional support in the embodiment is provided by the slung inner ring 25. The inner ring 25 comprises a support frame of suitable steel beams which is supported by the high tensile strength steel wires. In the embodiment these high tensile strength steel wires hang from the roof, but it will be appreciated that other structures may be provided separate from the roof as additional or alternative support means.

As has been previously indicated, the support members will typically be supported between paired inner side walls, but these are not shown in the drawings for clarity. The particular support structure illustrated in FIG. 2 further comprises cross beams 21 in a first direction on which is supported a central platform 27 and further transverse stays 23. The void factor within the support grid in the embodiment can be maintained to 92% minimum by appropriate use of the combination of slings and beams manufactured from bars, flat plates and flanges with controlled width.

Figure 3:
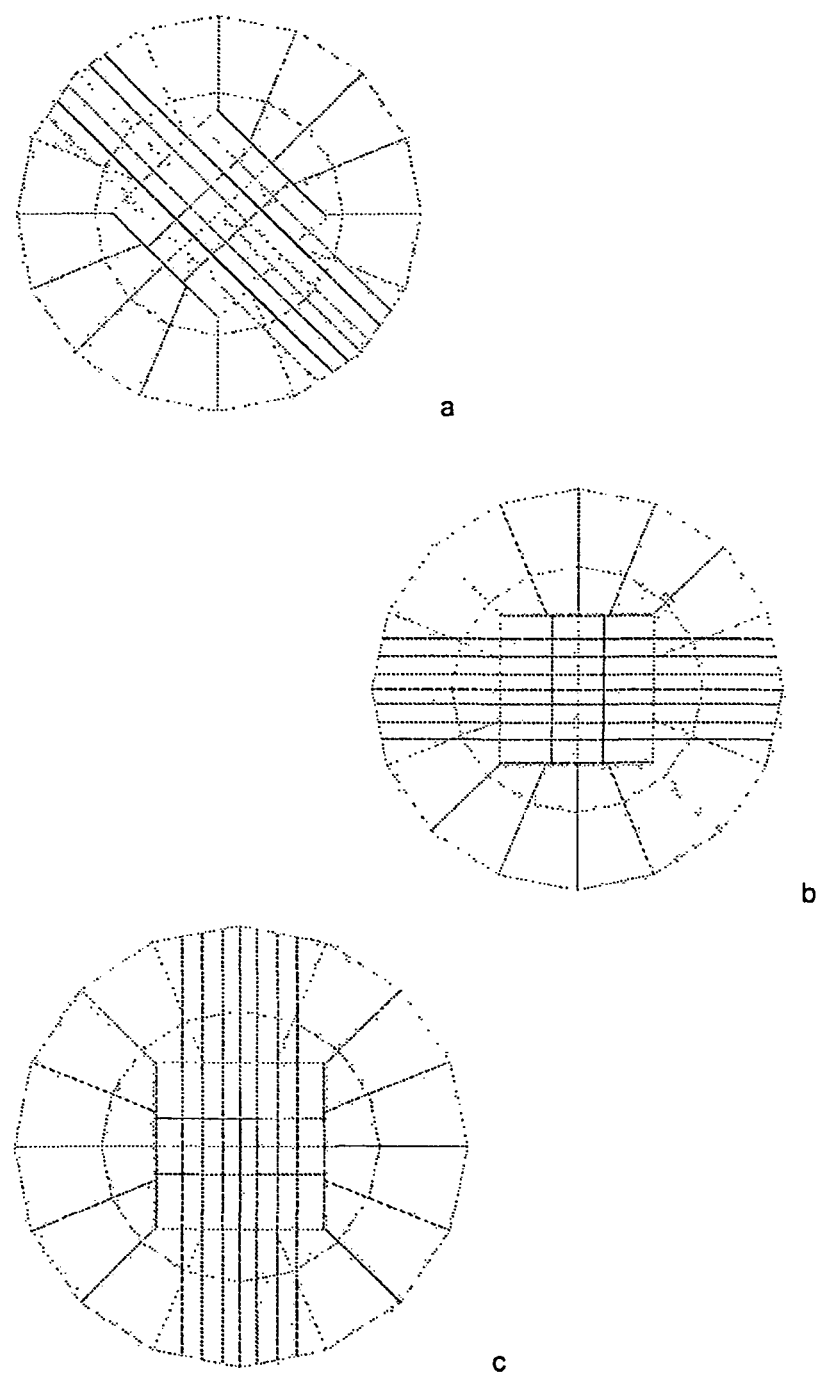
FIG. 3 illustrates in plan view the respective orientations of three further floor supports comprising second to fourth platform levels.

Three further support structures are illustrated in FIG. 3a to c, respectively being the support structures at the second to fourth levels. As is illustrated, the support structures are essentially identical, but each is placed in a different orientation to maximize the strengthening and stiffening effect of the transverse structures.

Figure 4:
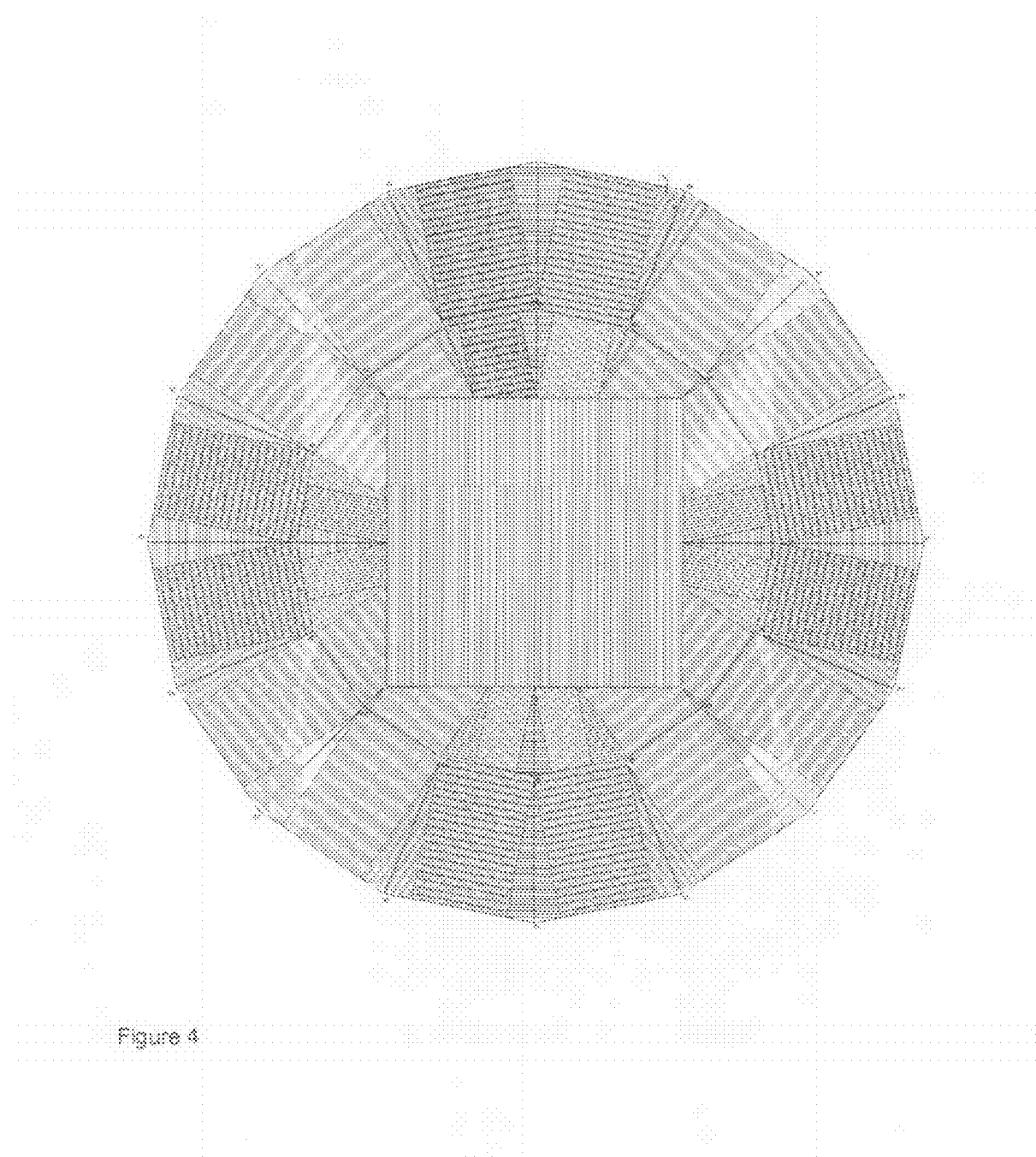
FIG. 4 illustrates in plan view a packing support grid, in this instance at level 4.

An example in plan view of a level of structured packing in situ is shown in FIG. 4. The structured packing may be of any suitable conventional form.

Figure 5:
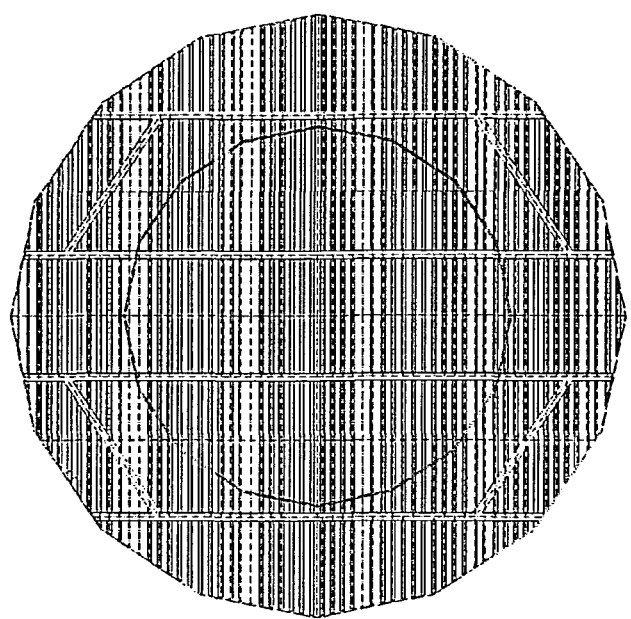
FIG. 5 illustrates in plan view an example distributor.
Figure 6:
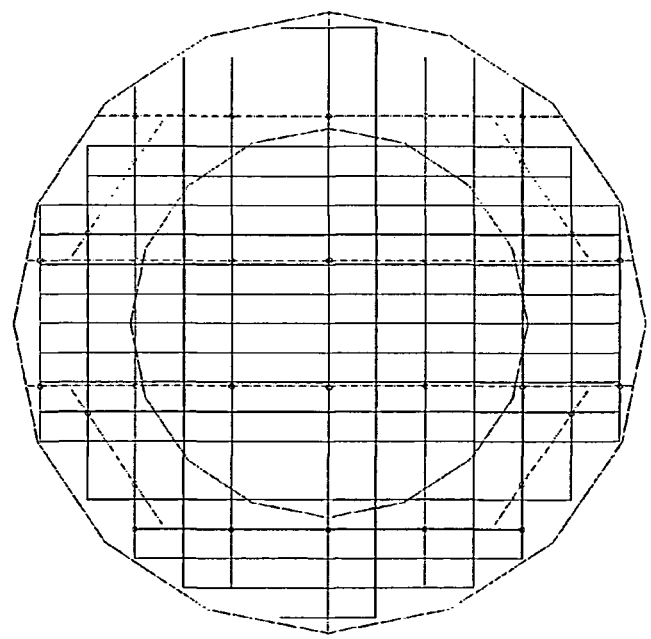
FIG. 6 illustrates in plan view an example bed limiter.

Possible designs of a typical distributor and a typical bed limiter are respectively shown in plan view in FIG. 5 and FIG. 6. The general principles of design will be familiar.

In the specific embodiment, both the polygonal shape and the provision of slung support structures contribute to the strength and stiffness of the column design, ensure that loads are better distributed in the vessel walls, and enable potentially larger columns to be constructed which still embody the basic principles and established chemistry of conventional wet $CO_2$ scrubbers with cylindrical columns. For example, the column in the illustrated embodiment might have a diameter of 18 m or 24 m, making practical the levels of flue gas throughput that would enable carbon capture from a full scale thermal power plant.

Figure 7:
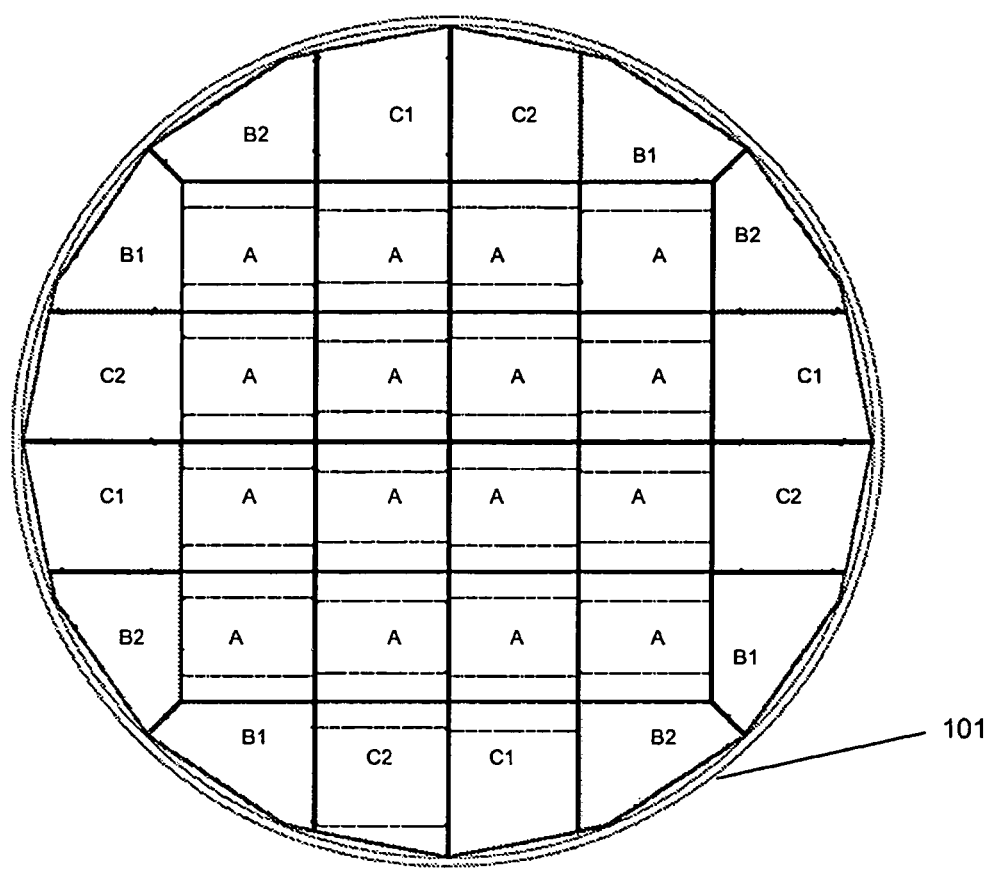
FIG. 7 illustrates in top plan view an alternative column arrangement in which a plurality of vessel modules are disposed within a load-bearing perimeter shell.

The example embodiment above is a simple system in which the column is a single vessel. The invention is not limited to such a system. For example a column may have a composite arrangement comprising one or more inner vessels defining one or more process volumes for the absorption process within a perimeter support structure, the perimeter support structure defining a column perimeter shape. A column may be a modular assembly of plural vessel modules, the resultant assembly defining a perimeter shape. FIG. 7 illustrates an embodiment with both such features.

In FIG. 7 a plurality of vessel modules (A, B1, B2, C1, C2) are arrayed within a perimeter wall structure 101. Each vessel module defines a process volume for the absorption process. The perimeter wall structure carries at least some of the load of the vessels via a support arrangement along the same principle as that shown in the previous embodiment.

A first series of vessel modules (A) define an inner zone in which modules with planar walls and square transverse section are in a square 4×4 array. There is also a perimeter zone (modules B1, B2, C1, C2) in which each module has similar walls where adapted to sit in the assembled structure adjacent an inner zone module (A) but other walls, sitting at the perimeter of the assembly, that define a polygonal perimeter for the assembly.

It can be seen that this minimizes the range of modules required. Each module in the inner zone is identical (type A) and only four module designs respectively being mirror image pairs (type B1, B2 and type C1, C2) are required in the perimeter zone. This simplifies the assembly process.

The modules are assembled in tessellating manner to create a hexadecagonal vessel assembly. The perimeter wall structure is in the example still cylindrical, but may alternatively also be polygonal.

The invention claimed is:

1. A column structure for the containment of high surface area packing and absorbent liquid reagent for the removal of a target gas from a gas stream, comprising:
   an elongate upright wall structure defining a perimeter comprising a closed simple polygon or closed simple curve;
   a support structure extending inwardly from the perimeter of the column towards a top thereof; and
   slung tensile members attached to the wall structure of a top support structure and extending downwardly to support at least one internal column structure within the walls of the column,
   wherein at least one internal partition wall structure is provided extending vertically along at least apart of the length of the column to partition the column where it so extends into at least two zones which are fluidly separate.

2. A column structure in accordance with claim 1 wherein a notional perimeter circumscribed by the vertical tensile members is additionally provided with a partition wall structure extending vertically along at least a part of the length of the column to partition the column where it so extends into at, least an inner and an outer zone which are fluidly separate.

3. A column structure in accordance with claim 2 wherein the partition wall comprises vertical wall members parallel to and either side of the tensile members.

4. A column structure in accordance with claim 2 wherein the partition wall is a similar shape to, smaller in transverse extent than, and concentrically disposed within, the outer vessel wall.

5. A column structure in accordance with claim 2 wherein a zone is further subdivided by one or more further wall structures.

6. A column structure for the containment of high surface area packing and absorbent liquid reagent for the removal of a target gas from a gas stream, comprising:
   an elongate upright wall structure defining a perimeter comprising a closed simple polygon or closed simple curve,
   a support structure extending inwardly from the perimeter of the column towards a top thereof; and slung tensile members attached to the wall structure of a top support structure and extending downwardly to support at least one internal column structure within the walls of the column, an elongate prismatic structure having plural planar generally vertical walls together defining a dosed simple polygonal perimeter, wherein the internal angle, between each wall making up the polygonal perimeter is at least 120° and less than 180°.

7. A column structure in accordance with claim 6 wherein the polygonal perimeter of the column is a cyclic polygon.

8. A column structure in accordance with claim 7 wherein the polygonal perimeter of the column is a regular equiangular and equilateral polygon.

9. A column structure in accordance with claim 6 wherein the polygonal perimeter of the column defines a polygon with an even number of sides.

10. A column structure in accordance with claim 9 wherein the column comprises paired opposite parallel sides.

11. A column structure in accordance with claim 6 wherein the column has 12 to 20 sides.

12. A column structure in accordance with claim 6 provided in the form of a plurality of planar wall modules, each comprising a structural sheet member to constitute when assembled in situ a part of a wall having a long dimension no greater than 6 m, and a plurality of connection members to provide for connection and assembly of the same into a complete column in situ.

\* \* \* \* \*